Dec. 5, 1961 H. T. MORTIMER 3,012,177
MAGNETIC POSITION SENSING DEVICE
Filed Feb. 8, 1957 3 Sheets-Sheet 1
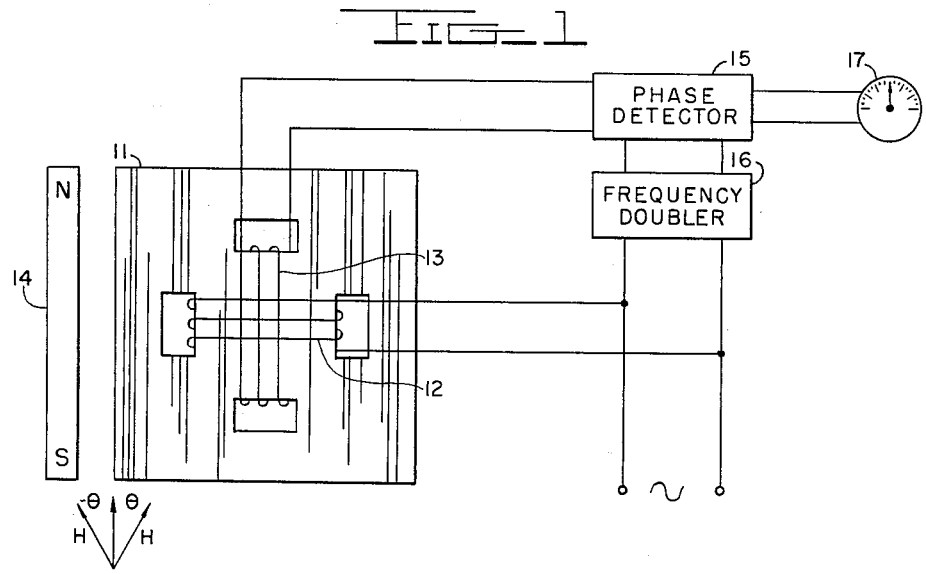
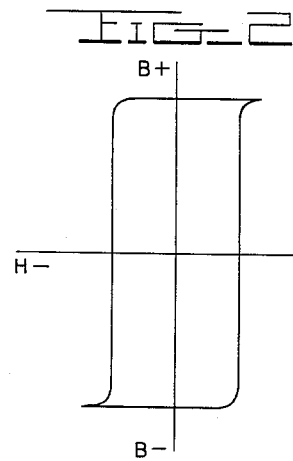
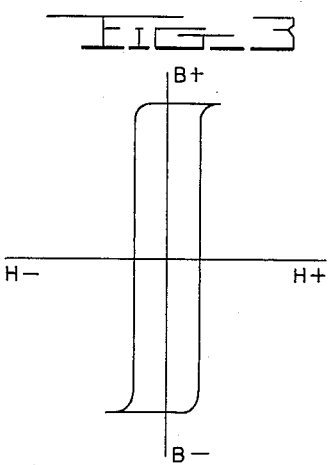
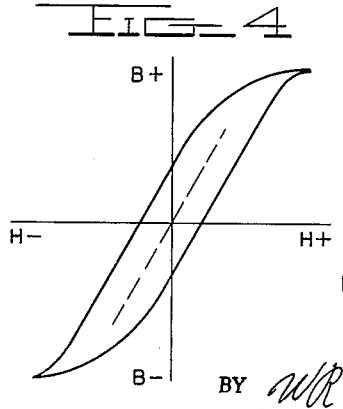
INVENTOR
HARRY T. MORTIMER
BY
ATTORNEYS

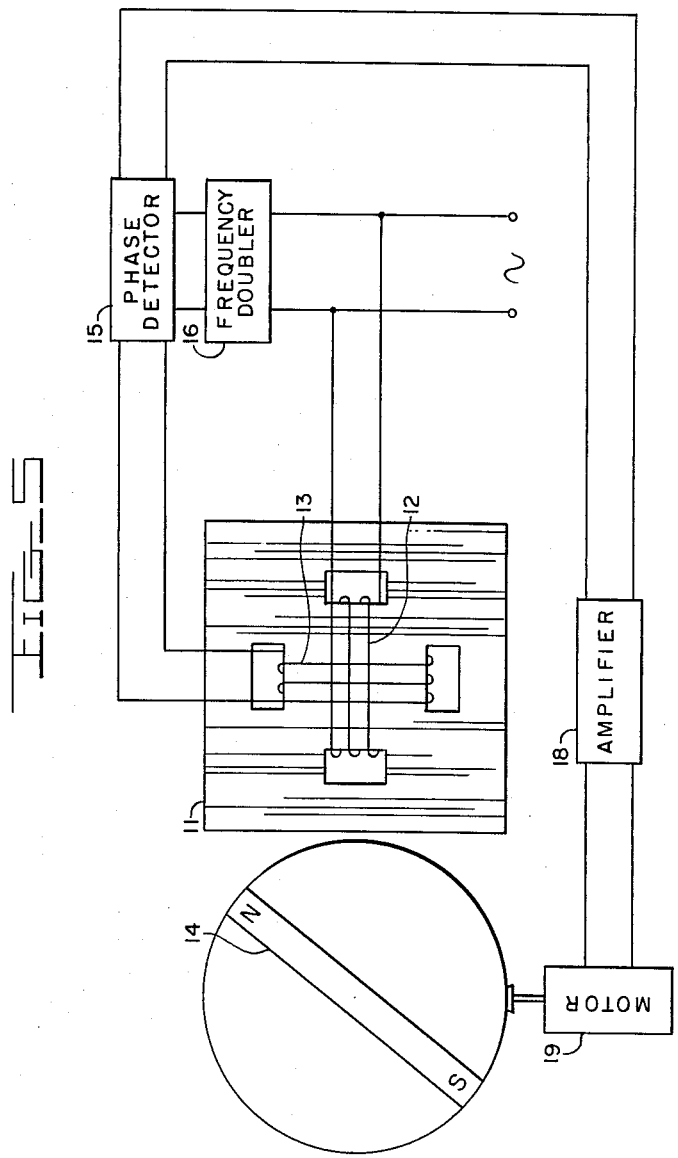

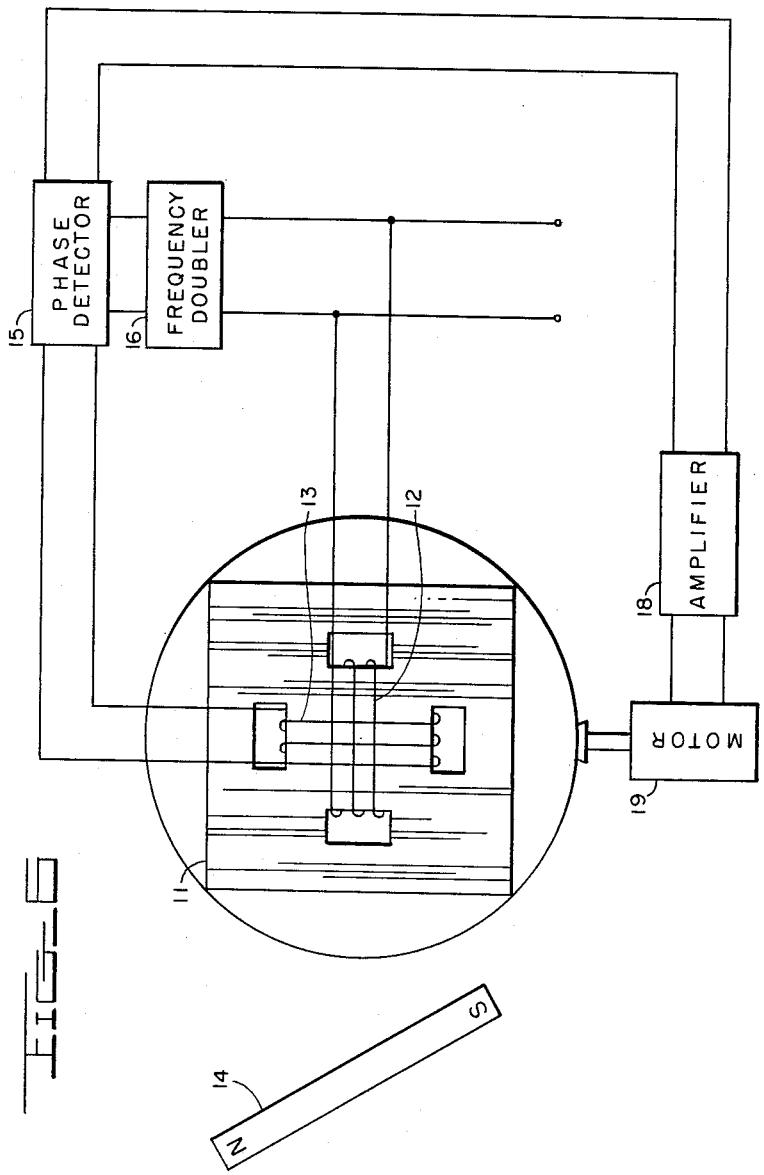

United States Patent Office 3,012,177
Patented Dec. 5, 1961

3,012,177
MAGNETIC POSITION SENSING DEVICE
Harry T. Mortimer, Los Angeles, Calif.
Filed Feb. 8, 1957, Ser. No. 639,128
10 Claims. (Cl. 318—32)
(Granted under Title 35, U.S. Code (1952), sec. 266)

The invention described herein may be manufactured and used by or for the Government of the United States of America for governmental purposes without the payment of any royalties thereon or therefor.

The present invention relates to magnetic angular position sensing devices and more particularly to such devices employing grain oriented magnetic material.

Devices sensitive to magnetic fields are known in which two parallel cores of magnetic material carry exciting windings designed to provide equal and opposite fluxes in the two cores upon the application of an alternating current. An output winding is disposed on the two cores in such a manner that no output voltage is developed from the flux in the two cores in the absence of an external field, but when an external magnetic field is applied, the flux of which couples the output winding, a voltage is developed in the output winding which contains predominantly the second harmonic of the exciting alternating current. The magnitude and polarity of the second harmonic thus produced depends upon the direction of the magnetic field with respect to the two magnetic cores previously mentioned.

In this type of device, it is essential that the magnetic flux produced in each of the two cores by the alternating current be exactly equal, so that no voltage is induced in the output winding in the absence of an external field. This usually requires external electrical components such as a potentiometer to insure equal magnetic fields in each of the two cores or a critical adjustment of the physical structure of the two cores. An example of this type of apparatus is found in U.S. Patent 2,476,723 to L. F. Beach.

The present invention uses a core composed of grain oriented magnetic material upon which are placed two windings disposed in orthogonal relationship. One of the windings is positioned substantially perpendicular to the grain orientation of the material and is excited by an alternating magnetomotive force of a given frequency which produces lines of flux parallel to the direction of grain orientation. The lines of flux are thus confined to the material and are parallel to grain orientation. An output winding is positioned upon the core at substantially right angles to the input winding but parallel to the direction of grain orientation and hence no voltage will be developed in this winding as the flux from the first winding has no component perpendicular to the second winding.

An external magnetic field applied parallel to the grain orientation of the material will cause no voltage to be induced in the output winding, but an external field applied at an angle to the grain orientation will produce an output voltage proportional in amplitude to the angle between the field and the direction of grain orientation. The output produced will be primarily the second harmonic of the exciting current and will have a phase determined by the angular position of the applied magnetic field in relation to the grain orientation of the material. Thus only one core is necessary and no critical adjustments are required to sense and indicate the direction of the magnetic field.

An object of the present invention is the provision of a magnetic field position sensing device.

Another object is to provide a magnetic field position sensing device which produces an output potential which is a function of the angular position of the magnetic field with respect to a given axis of the device.

A further object of the invention is the provision of a magnetic sensing device, which is simple, rugged and has a minimum number of components.

Still another object is to provide a magnetic field position sensing device in which the non-linear characteristics of the hysteresis loop of magnetic materials are utilized to produce a second harmonic output voltage of magnitude and phase determined by the angular position of the magnetic field with respect to a given axis of the device.

A further object of the invention is the provision of a device for sensing the magnitude and direction of the angular error in the position of a device which it is desired to control.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 shows an embodiment of the invention in which the angular position of a magnetic field is indicated by a meter or other suitable indicating device.

FIG. 2 is a hysteresis loop of the grain oriented material perpendicular to the direction of grain orientation.

FIG. 3 is the hysteresis loop of the grain oriented material in the direction of grain orientation.

FIG. 4 depicts the hysteresis loop of the material under the influence of an external magnetic field applied at an angle to the grain orientation.

FIG. 5 illustrates an embodiment of the invention which senses the angular error in the position of a device and restores it to an original desired position.

FIG. 6 illustrates a further embodiment.

Referring now to the drawings in which like reference characters designate like or corresponding parts throughout the several views, there is shown in FIG. 1 a metallic core 11 made of grain oriented magnetic material such as Hypersil, Trancor, 3X etc., having an input winding 12 positioned thereon substantially perpendicular to the direction of grain orientation and an output winding 13 positioned thereon substantially parallel to the direction of grain orientation. In the absence of an external magnetic field or when the external field represented in the drawing by a permanent magnet 14 is parallel to the direction of the grain orientation of the magnetic material 11, no voltage is induced in the output winding 13. If, however, the angular position of the magnetic field is changed with respect to the grain orientation of the material, a voltage is induced in the output winding 13 which is predominantly the second harmonic of the input voltage in the winding 12 and is proportional to the angle between the grain orientation and the magnetic field. The phase of the induced voltage depends on the direction of the angular deviation of the magnetic field with respect to the direction of the grain orientation. The voltage induced as a result of a clockwise displacement is 180° out of phase with respect to a voltage induced by a counterclockwise displacement of the magnetic field.

A phase detector 15 which can be any phase sensitive device known in the art is connected to the output winding 13 and since the output contains predominantly the second harmonic of the input voltage, a frequency doubler 16 is provided to double the frequency of the input signal before it is applied to the phase detector 15. The output from the phase detector will be proportional in magnitude to the angle $\theta$ as shown in FIG. 1 and will be positive or negative depending on the sign of the angle $\theta$, plus or minus. This output is applied to an indicating device 17, such as a direct current meter, which will then indicate the magnitude of the angular displacement between the external magnetic field and the direction of the grain orientation of the material 11 and will indicate by the polarity whether this angle is clockwise or counterclockwise with respect to the grain orientation, that is, whether $\theta$ is plus or minus.

The grain oriented material employed in metallic form 11 on which windings 12 and 13 are cross-positioned is normally produced by a cold rolling process on silicon iron, generally with a silicon content up to 3.5%. This process provides a magnetically anisotropic sheet in which the crystalline structure seems to take up a preferred orientation and the finished sheet has directional magnetic properties similar to those for a single crystal. The direction of maximum permeability and the minimum hysteresis loss is in the direction of rolling as indicated by the hysteresis loop of FIG. 3 which shows the B—H characteristics of the material in the direction of rolling or grain orientation contrasted with the permeability and hysteresis loss in the material perpendicular to the direction of the grain orientation as shown in FIG. 2.

It is believed that the theory of operation of the device is as follows, however, it is not intended that the invention in any way be restricted by the explanation.

In the absence of any applied external field such as the magnetic field associated with the permanent magnet 14, the time varying magnetic field created by the M.M.F. in the input winding 12 is perpendicular to the input winding and since the output winding 13 is also perpendicular to the input winding 12, the winding 13 does not cut any lines of flux and hence no output results. The grain oriented material assists materially in confining the flux to paths perpendicular to the direction of the winding 12. A similar situation results upon the application of an external magnetic field parallel to the direction of the grain orientation of the core 11 and winding 13, but perpendicular to the winding 12. This field may bias the magnetic core material so that it operates higher up on the hysteresis loop shown in FIG. 3, but this loop is substantially linear, hence no harmonics are produced, and in addition since the field is in the same direction as the grain orientation of the material 11 and the winding 13 none of the flux produced by the winding 12 couples the winding 13 and no output results.

However, if the external magnetic field represented by the permanent magnet 14 is rotated either clockwise as represented by the angle $\theta$ or counterclockwise as represented by the angle $-\theta$, the material operates about a non-linear hysteresis loop as shown in FIG. 4 and harmonics of the input voltage to the coil 12 are produced which now couple with the coil 13 to produce an output voltage which is predominantly the second harmonic of the input voltage. Assuming a clockwise rotation of the magnetic field, or an increasing $\theta$, the magnitude of the second harmonic increases in proportion to the angle until the magnetic field is perpendicular to the grain orienttaion of the material 11; at this point the magnitude of the second harmonic reaches a maximum and then decreases proportionally as the angle is increased from 90° to 180°. It is believed that as the angle is increased from 0° to 90°, the hysteresis loop as shown in FIG. 4 becomes more non-linear thus producing more of the second harmonic and in addition more effective coupling is obtained as the angle between the external field and the coil 13 approaches ninety degrees. A similar but opposite action results as the angle is increased from 90° to 180°.

If the angle of the magnetic field is varied from 0° to 180° in a counterclockwise direction or a $-\theta$ direction, a similar phenomenon is produced with the exception that the second harmonic output is 180° out of phase with that produced when the angle of the magnetic field is varied through a clockwise direction from 0 to 180°.

The device of the present invention is particularly useful in controlling the angular position of any rotatable device and referring now to FIG. 5 the permanent magnet 14, or other means for producing a magnetic field such as an electro-magnet, is affixed to the object to be controlled which is in close proximity to the grain oriented material core 11 with input winding 12 and output winding 13 disposed thereon. When the object to be controlled is in a desired position so the magnetic field of the magnet 14 is parallel to the grain orientation of the material 11 and the winding 13, no output will be produced, however if the object to be controlled is rotated from the desired position, the magnetic field is turned through an angle with respect to the grain orientation of the material 11, a voltage will be induced in the output winding 13, and converted to usable power by the phase detector 15. The output from the phase detector 15 is then amplified by the D.C. amplifier 18, and the amplified signal is then used to power a motor 19 which rotates the object to be controlled back to the desired position, so that the external field of the magnet 14 is again parallel to the grain orientation of the material.

As shown in FIG. 6 the magnetic core 11, with windings 12 and 13 may be affixed to the device to be controlled and that the motor 19 could be used to drive this device so that the direction of grain orientation of the core 11 would be driven to a direction parallel to the direction of the magnetic field 14. Such a device could be made sensitive to the earth's magnetic field and therefore could be used in an initial guidance system for airborne missiles or the like.

Thus, there has been provided a magnetic field sensing device which is simple, rugged and has a minimum number of components and is capable of controlling the angular position of a mechanical device.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

What is claimed is:

1. A magnetic field position sensing device comprising a core of magnetically anisotropic material having a determined direction of grain orientation, means for applying a time varying magnetic field to said core substantially parallel to the direction of grain orientation, a unidirectional magnetic field applied to said core, and output means magnetically linked with said core for extracting an output signal proportional in magnitude to the smaller angle between the direction of the unidirectional magnetic field and the direction of grain orientation of said core.

2. In a magnetic position sensing device for producing an output potential dependent in magnitude upon the direction of an external field relative thereto, a core of material having a determined direction of grain orientation material, an input winding for receiving an exciting signal positioned upon said core wound about an axis parallel to the direction of grain orientation of said material, an output winding positioned upon said core wound about an axis perpendicular to the axis of said input winding and substantially parallel to the direction of grain orientation of said material, and means connected to said output winding for indicating the magnitude and polarity of the potential induced in said output winding.

3. The sensing device according to claim 2 wherein said core is symmetrical about each of two orthogonal intersecting axes, said core having a pair of apertures on each axis with the point of intersection of said axes positioned between the apertures of each pair, each of said input and output windings being mounted in the apertures associated with one of said axes.

4. In a magnetic position sensing device for producing an output potential dependent in magnitude and polarity upon the direction of an external magnetic field, a core of magnetically anisotropic material having a determined grain orientation, a first and second winding, a signal source applied to said first winding, said first and second windings positioned upon said form in a crosswise manner such that the magnetic field produced by said first winding is in the direction of the grain orientation of said material, and means connected to the second winding to indicate the magnitude and polarity of the voltage induced therein.

5. A magnetic field position sensing device comprising a core of magnetically anisotropic material having a determined direction of grain orientation, an input winding wound on said core about an axis parallel to the direction of grain orientation, an alternating source of electrical energy connected to said input winding, an output winding wound on said core about an axis perpendicular to the direction of grain orientation, a unidirectional magnetic field applied to said core for causing a voltage to be induced in said output winding of double the frequency of said alternating source of electrical energy and of magnitude and phase dependent upon the direction of said external magnetic field with respect to the direction of grain orientation of said core, a frequency doubler connected to said source of electrical energy, phase detecting means connected to said frequency doubler and said output winding for measuring and indicating the phase difference between the signal induced in said output winding and the output signal from said frequency doubler.

6. In a magnetic position controlling device, a core of magnetically anisotropic material having a determined direction of grain orientation, means for producing a time-varying magnetic field in said material in the direction of the grain orientation, an object whose angular position is to be controlled positioned in close proximity to said core, a magnetic device for producing a unidirectional magnetic field in said core, affixed to said object, output means magnetically linked with said core for extracting an output signal proportional in magnitude to the direction of said unidirectional magnetic field relative to the direction of grain orientation of said magnetically anisotropic material, drive means for rotating said object in response to a control signal and means connecting the output means with said drive means whereby said output signal acts as said control signal.

7. A magnetic field position controlling device comprising a rotary object to be controlled, a magnetic device for producing a unidirectional magnetic field affixed to said rotary object, electrical drive means for rotating said object, a core of magnetically anisotropic material having a determined direction of grain orientation located within said unidirectional magnetic field, an input winding for receiving an exciting signal positioned on said core wound about an axis parallel to the direction of grain orientation, an output winding positioned upon said form wound about an axis perpendicular to the direction of grain orientation, and an electrical feedback path connecting said output winding with the electrical drive means.

8. A magnetic position controlling device comprising a core of magnetically anisotropic material having a determined direction of grain orientation, an input winding wound on said core about an axis parallel to the direction of grain orientation, an alternating source of electrical energy connected to said input winding, an output winding wound on said core about an axis perpendicular to the direction of grain orientation, a rotary object to be controlled, a unidirectional magnetic field source affixed to said rotary object, said source magnetically coupling said core, thereby causing a voltage to be induced in said output winding of double the frequency of said alternating source of electrical energy and of magnitude and phase dependent upon the direction of said unidirectional magnetic field with respect to the direction of grain orientation of said core, a frequency doubler connected to said source of electrical energy, phase detecting means connected to said frequency doubler and said output winding for developing a unidirectional voltage proportional in magnitude to the magnitude of the voltage induced in said output winding and of a polarity determined by the phase of the voltage developed in said output winding with respect to the output voltage of said frequency doubler, and drive means connected to said rotary and said output winding object for rotating said object in response to the unidirectional voltage from said phase detector.

9. A magnetic position controlling device comprising a core of magnetically anisotropic material having a determined direction of grain orientation, an input winding wound on said core about an axis parallel to the direction of grain orientation for receiving an alternating source of electrical energy, an output winding wound on said core about an axis perpendicular to the direction of grain orientation, a unidirectional magnetic field applied to said core for causing an output voltage to be induced in said output winding when said external field is at an angle to the direction of grain orientation but causing no induced voltage in the output winding when said field is parallel to the direction of grain orientation, and means connected to said output winding for rotating said core into a position where the direction of grain orientation and said unidirectional magnetic field are parallel to each other in response to voltage induced in said output winding.

10. A magnetic field position sensing device comprising a core of magnetically anisotropic material having a determined direction of grain orientation, means for applying a time varying magnetic field to said core substantially parallel to the direction of grain orientation, an external magnet means spaced from said core for applying a unidirectional magnetic field to said core, and output means magnetically linked with said core for extracting an output signal proportional in magnitude to the smaller angle between the direction of the unidirectional magnetic field and the direction of grain orientation of said core.

References Cited in the file of this patent

UNITED STATES PATENTS

| | | |
|---|---|---|
| 2,476,273 | Beach | July 19, 1949 |
| 2,543,843 | Frosch | Mar. 6, 1951 |
| 2,569,468 | Gaugler | Oct. 2, 1951 |
| 2,703,388 | McCreary | Mar. 1, 1955 |
| 2,815,499 | Brynes | Dec. 3, 1957 |
| 2,856,581 | Alldredge | Oct. 14, 1958 |

FOREIGN PATENTS

| | | |
|---|---|---|
| 592,241 | Great Britain | Sept. 11, 1947 |

OTHER REFERENCES

Electronics, January 1947, pages 100–101.

"Transformer Steels," by C. D. Mee, Electrical Review, Sept. 11, 1953, pp. 551–555.